Patented May 1, 1945

2,374,780

UNITED STATES PATENT OFFICE 2,374,780

PRODUCTION OF ARTIFICIAL TEXTILE MATERIALS, FILMS, AND OTHER SHAPED ARTICLES HAVING A BASIS OF A POLYMERIZED VINYL ESTER

Robert Pierce Roberts and Edgar Bert Johnson, Spondon, near Derby, and Michael Antony Young, Bristol, England, assignors to Celanese Corporation of America, a corporation of Delaware No Drawing. Application October 23, 1941, Serial No. 416,212. In Great Britain March 4, 1941

3 Claims. (Cl. 260—32)

This invention relates to the production of artificial textile materials, e. g. filaments, films and other shaped articles having a basis of a polymerized vinyl ester.

In forming filaments and the like from high molecular weight polymerization products of mixtures of a vinyl halide and a vinyl ester of an aliphatic acid it has hitherto been proposed to shape and set acetone solutions of the products. However, we have found that such so-called solutions are unsatisfactory for the purpose of producing uniform products, since they lack homogeneity, even at temperatures of the order of the boiling point of acetone. We have further found that this defect can be effectively overcome by employing, as solvent of compositions from which filaments and the like are to be formed, a mixture comprising acetone and one or more other organic liquids, which need not at ordinary temperatures be solvents for the polymerization product.

According to the invention, therefore, artificial textile materials, films and other shaped articles are produced by a process which comprises shaping a solution of a polymerized mixture of a vinyl halide and a vinyl ester of an aliphatic acid in a mixture of acetone and another organic liquid, and setting the shaped materials by evaporation of solvent therefrom.

Preferably the additional organic liquids are such as produce, in admixture with acetone, solutions of the polymer having lower viscosity than solutions of equal concentration in substantially pure acetone. These additional liquids advantageously possess a solvent or swelling action for the polymer and are referred to in the appended claims as swelling agents. Particularly suitable liquids are, for example, aromatic hydrocarbons, especially benzene, toluene and xylene, and aliphatic ethers, especially cyclic ethers, e. g. ethylene methylene ether and dioxane. Thus, very satisfactory solvent media consist of about 70–80 parts by volume of acetone and 30–20 parts by volume of benzene, especially a 75/25 mixture, or of about 45–60 parts by volume of acetone and 55–40 parts by volume of ethylene methylene ether, especially a 50/50 mixture. Other suitable liquids possessing swelling power for the polymer are, for example, ethylene dichloride, methylene chloride and certain high-boiling or substantially non-volatile agents such as, for example, cyclohexanone, methyl cyclohexanone, cyclohexanol oxalate, dimethyl-cyclohexanol oxalate, and methyl cyclohexanol stearate. Suitable solvent mixtures comprising such high-boiling or relatively non-volatile agents may contain about 5–12 or 15% or more thereof, based on the weight of the polymer to be dissolved in the mixture.

The invention is of the greatest importance in connection with the spinning of filaments from high molecular weight products, e. g. products of molecular weight above 10,000 or 12,000 and preferably substantially above 15,000, e. g. 22,000 to 25,000 or more, formed by polymerizing a mixture comprising a large proportion of the vinyl halide, especially the chloride, in relation to the proportion of the vinyl ester of an organic acid. The esters of organic acids are preferably those of lower fatty acids, among which acetic, propionic and butyric acids are important examples; esters of substitution derivatives of these acids, e. g. lower halogen-fatty acids, may also be employed. Particularly suitable polymerization products are such as may be produced from mixtures of 80 or 85 to 95 or 97% by weight of vinyl chloride, the remainder of the mixture being vinyl acetate. If desired, more than one halide and/or more than one ester of an organic acid may be present in the polymer.

The concentration of polymer in the solution to be spun is preferably between about 15% and 30%, especially about 25%. The solution may be prepared by kneading a quantity of the polymer with solvent mixture, advantageously at elevated temperature, and then diluting or concentrating the product, as necessary, to bring it to the desired concentration. Alternatively, the polymer may be kneaded with acetone and the other component or components of the solvent mixture may then be added, or vice versa, adjustments of concentration being made at any stage as desired. The solution may be filtered, preferably at somewhat elevated temperature, and freed from air, e. g. by being left to stand at elevated temperature for several hours. It may be desirable to filter the solution while relatively highly diluted, so as to facilitate the filtration, and to concentrate by evaporation thereafter.

Filaments may be formed from such solutions by the usual evaporative method, with the modification that the extruded materials, after setting, are passed through an aqueous bath, which may be either cold or hot, e. g. at or above 50° C., before being wound up. Winding may take place in the aqueous bath itself. The temperature of the evaporative medium may be, for example, of the order of 95° C. and the spinning speed about 60 metres per minute, though these conditions will depend in part upon the composition of the solution and the diameter of the extrusion orifices as well as upon the length of travel through the evaporative medium. Films and other shaped articles may be produced in a similar manner, being advantageously immersed in an aqueous bath for a period after shaping.

The set materials may advantageously be subjected to a stretching operation to increase their length by 60% to 180% or even up to 1,000% or more of their original length in one or more stages. While this operation is preferably effected according to the process of U. S. application S. No. 416,213 filed October 23, 1941, it may also be carried out while the materials are merely wetted with hot or cold water, with or without a wetting agent.

Filamentary products formed according to the invention may be twisted together to form yarns which may be subjected to knitting, weaving or other fabric-forming operations. The regularity of the filamentary products leads to a high degree of evenness in fabrics formed from them.

Example 1

A polymerized mixture of 91% of vinyl chloride and 9% vinyl acetate having a molecular weight of about 24,400 (as determined by viscosity measurement), is dissolved in a mixture of 96.6% by weight of acetone and 3.3% by weight of dimethyl cyclohexanol oxalate to form a 25% solution. After filtration and deaeration, the solution is extruded through a jet having 20 orifices of 0.1 mm. diameter into a normal dry spinning chamber in which the air is maintained at a temperature of 95° C. in the neighborhood of the jet. After passing through the chamber the filamentary materials are led through a bath of water at room temperature and are wound on a bobbin with or without twisting.

Example 2

The polymer described in Example 1 is dissolved in a mixture of 75 parts by volume of acetone and 25 parts of benzene to form a 25% solution. Spinning and winding is carried out as in Example 1.

Example 3

The polymer described in Example 1 is dissolved in a mixture of 50 parts by volume of acetone and 50 parts by volume of ethylene methylene ether to form a 25% solution. Spinning and winding is carried out as in Example 1.

Having described our invention, what we desire to secure by Letters Patent is:

1. A solution for use in the production of artificial textile materials, films and other shaped articles by the extrusion thereof through an orifice into a setting medium, comprising a polymerized mixture of vinyl chloride and vinyl acetate in a mixture consisting of from 45 to 60% by volume of acetone and from 55 to 40% by volume of ethylene methylene ether, said polymerized mixture being present in said solution in a concentration of 15 to 30%.

2. A solution for use in the production of artificial textile materials, films and other shaped articles by the extrusion thereof through an orifice into a setting medium, comprising a polymerized mixture of 80 to 97% by weight of vinyl chloride and 20 to 3% by weight of vinyl acetate in a mixture consisting of from 45 to 60% by volume of acetone and from 55 to 40% by volume of ethylene methylene ether, said polymerized mixture being present in said solution in a concentration of 15 to 30%.

3. A solution for use in the production of artificial textile materials, films and other shaped articles by the extrusion thereof through an orifice into a setting medium, comprising a polymerized mixture of 91% by weight of vinyl chloride and 9% by weight of vinyl acetate in a mixture consisting of from 45 to 60% by volume of acetone and from 55 to 40% by volume of ethylene methylene ether, said polymerized mixture being present in said solution in a concentration of 25%.

ROBERT PIERCE ROBERTS.
EDGAR BERT JOHNSON.
MICHAEL ANTONY YOUNG.